United States Patent
Bastianelli et al.

(10) Patent No.: US 7,634,416 B2
(45) Date of Patent: Dec. 15, 2009

(54) METHOD OF PLANNING A FUNERAL OR OTHER MEMORIAL SERVICE

(75) Inventors: Ann Bastianelli, Indianapolis, IN (US); John Hinger, Cincinnati, OH (US)

(73) Assignee: Batesville Services, Inc., Batesville, IN (US)

( * ) Notice: Subject to any disclaimer, the term of this patent is extended or adjusted under 35 U.S.C. 154(b) by 730 days.

(21) Appl. No.: 10/682,665

(22) Filed: Oct. 9, 2003

(65) Prior Publication Data
US 2004/0073450 A1  Apr. 15, 2004

Related U.S. Application Data

(63) Continuation of application No. 09/702,295, filed on Oct. 31, 2000, now abandoned.

(51) Int. Cl.
G06Q 10/00 (2006.01)
G06Q 30/00 (2006.01)

(52) U.S. Cl. ......................................... 705/1
(58) Field of Classification Search ............. 705/1, 705/26, 27, 28
See application file for complete search history.

(56) References Cited

U.S. PATENT DOCUMENTS

| | | |
|---|---|---|
| 5,405,017 A | 4/1995 | Szabo, Sr. et al. |
| 5,611,124 A | 3/1997 | Biondo et al. |
| 5,787,626 A | 8/1998 | Bingham et al. |
| 6,340,978 B1 * | 1/2002 | Mindrum ................ 715/764 |
| 2001/0032093 A1 * | 10/2001 | Segal ........................ 705/1 |
| 2002/0004757 A1 * | 1/2002 | Torres et al. ............. 705/26 |
| 2002/0046046 A1 | 4/2002 | Barrott et al. |
| 2003/0212611 A1 * | 11/2003 | Barrott et al. ........... 705/27 |

FOREIGN PATENT DOCUMENTS

DE          10161959          * 12/2001

OTHER PUBLICATIONS

Pugh, Clifford, To Die For/ Funerals trending toward custom touches; Houston Chronicle.com, Jul. 19, 1998.*

(Continued)

*Primary Examiner*—Tan Dean D Nguyen
*Assistant Examiner*—Thuy-Vi Nguyen
(74) *Attorney, Agent, or Firm*—Wood, Herron & Evans, LLP

(57) ABSTRACT

A method of assisting a loved one of a deceased in planning a funeral or other service which memorializes the deceased. The method may be initiated with the "planner," i.e. a funeral director or computer and software, querying the loved one as to various aspects of the life of the deceased. Then, based on the loved one's responses to the queries, a theme is selected, from a menu of themes, for a vignette to be incorporated into the funeral or other service. Finally, within the selected theme, one or more memorial items are selected from a menu of memorial items to be utilized in the vignette. Alternatively, the queries can be dispensed with, and the loved one can immediately select a vignette theme from the menu of themes (assisted by either the funeral director or via interactive software running on a computer). Then, as before, one or more memorial items within the selected theme are chosen from a menu of possible memorial items, and are utilized in the vignette in the funeral or other memorial service.

45 Claims, 4 Drawing Sheets

OTHER PUBLICATIONS

Business Editors, At Turn of the Millennium, Americans Looking for New Funeral Choices, Batesville Data Show, New York, Nov. 2, 1999.*

Stetler, Carrie, For the "Deceased to Be," Funeral Planning Goes Online, Newhouse News Service, Washington, Aug. 26, 1999.*

Ebenkamp, Becky, Happy deathday!, Brandweek, Nov. 22, 1999.*

Gillam, Carey, Funerals with Themes Coming Soon, Seattle Times Nov. 3, 1999.*

Now You Can Go Out In Style, Bristol Evening Post, Apr. 4, 2000.*

* cited by examiner

METHOD OF PLANNING A FUNERAL OR OTHER MEMORIAL SERVICE

This application is a continuation of U.S. patent application Ser. No. 09/702,295 filed on Oct. 31, 2000 by Anne Bastianelli et al., the disclosure of which is fully incorporated by reference herein. Said application is now abandoned.

FIELD OF THE INVENTION

This invention relates generally to the death care industry, and more particularly to funerals and other memorial services and methods of planning the same.

BACKGROUND OF THE INVENTION

Upon the death of a family member the surviving loved one of the deceased must make a number of decisions, including what type of funeral or other memorial service to hold, preparation of the body, selection of a suitable casket or cremation urn, etc. In the death care industry it is conventional for those decisions to be made in a so-called "arrangement conference." In an arrangement conference, the funeral director meets with the surviving loved one of the deceased, typically in the funeral home of the funeral director. and describes to and discusses with the surviving loved one the various funeral products and services which are available. The funeral director may use visual aids such as a product catalog, product display board (such as that disclosed in the assignee's U.S. Pat. No. 5,787,626 titled Funeral Product Display Case hereby incorporated by reference herein) and a casket selection room (such as that disclosed in the assignee's U.S. Pat. No. 5,405,017 titled Modular Casket Display System and in the assignee's pending application Ser. No. 09/638,576 titled Display For A Casket Selection and/or Viewing Room both hereby incorporated by reference herein) to illustrated the products available to the customer.

There is a trend in the death care industry to make efforts towards "personalizing" the funeral products and the funeral or other memorial service purchased for the deceased. Rather than selling "cookie cutter" or "one size fits all" caskets, as one example, manufacturers and funeral directors are now beginning to manufacture and offer many "modular" variations thereby allowing the loved one to in essence design a specific casket especially suited to the deceased. For example, customers can select from a number of casket materials, casket finishes, casket corner adornments and casket interiors. Advances made in the area of "quick change" and "tool less" fastening mechanisms have greatly facilitated the rapid removal of one accessory from the casket and the rapid installation of another more desirable accessory to the casket. In addition to promoting personalization of the casket to the deceased, such interchangeability greatly reduces the amount of inventory the funeral director must keep on hand. An example may be seen in the assignee's pending application Ser. No. 09/660,574 titled Quick Change Casket Corner Attachment Mechanism and hereby incorporated by reference herein, commercially available as the Batesville® Life-Symbols® line of interchangeable corner adornments.

The "custom" casket interiors available to the funeral customer today include not only the internal lining material of the casket but also the decorative cap panels that fit within the underneath of the casket cap which serve to present a visually aesthetically pleasing appearance to the underside of the cap when in the open position. The cap panel can be embroidered with a favorite saying of the deceased, a scene depicting the deceased's hobby, etc. Special cap panels have even been designed which, in addition to performing a memorial function while installed in the casket, are adapted to be presented to the loved one surviving the deceased to be displayed by the loved one in his or her home as a keepsake. See application Ser. No. 09/165,990 titled Dish Assembly For A Burial Casket Cap assigned to the assignee of the present invention and hereby incorporated by reference herein, the subject of which is commercially available as the Batesville® Memory-Frame® line of cap panels. The casket can also include a memorabilia drawer in which keepsakes of the deceased can be stored and displayed, as disclosed in the assignee's U.S. Pat. No. 5,611,124 titled Casket Having Memorabilia Compartment and hereby incorporated by reference herein, commercially available as the Batesville® MemorySafe® line of caskets including memorabilia drawers.

Advances have therefore been made not only in the area of "arrangement" as is demonstrated with some of the novel products discussed above, but in the area of "personalization" as well as is also demonstrated with others of the novel products discussed above. What is missing however is a systematic way, manner or approach to combine the personalization aspect of the funeral products and services with the arrangement function.

SUMMARY OF THE INVENTION

The invention successfully incorporates personalization into the arrangement function, while providing a systematic method of arranging the funeral or other memorial service. The invention is a method of assisting a loved one of a deceased in planning a funeral or other service which memorializes the deceased. Preferably, though not necessarily, the method is initiated with the "planner," i.e. a funeral director or computer and software, querying the loved one as to various aspects of the life of the deceased. Then, based on the loved one's responses to the queries, a theme is selected, from a menu of themes, for a vignette to be incorporated into the funeral or other service. Finally, within the selected theme, one or more memorial items are selected from a menu of memorial items to be utilized in the vignette.

The queries posed to the loved one are designed to elicit responses which aid the arranger in planning or arranging the funeral or other ceremony. These queries take the form of: "How did the deceased LIVE?," "Whom did the deceased LOVE?," "What made the deceased LAUGH?," "What did the deceased LEARN?," and "What LEGACY did the deceased leave?" Based on the loved one's responses to the queries, a theme is selected from a menu of themes for the vignette. Then one or more memorial items within the selected theme are chosen from a menu of memorial items for use in the vignette.

Alternatively, the queries can be dispensed with, and the loved one can begin by selecting the vignette theme from a menu of themes (assisted by either a funeral director or via interactive software running on a computer). Then, as before, one or more memorial items within the selected theme are chosen from a menu of possible memorial items, and are utilized in the vignette in the funeral or other memorial service.

The vignette theme can be designed around the lifestyle of the deceased, the vocation of the deceased, the avocation of the deceased or other aspect of the deceased's life. The vignette theme can be selected from among military service, gardening, farming, hunting, fishing, and music, as examples.

The menu of memorial items preferably includes memorial products. The memorial products may include a plurality of casket designs, including custom engraved caskets, caskets including a memorabilia drawer, caskets including a memorial record tube and caskets including custom cap panel designs. In the case of cap panel designs the cap panel can be especially adapted to be removed from the casket and presented to the loved one as a keepsake. The plurality of casket designs also includes a plurality of casket corner adornment designs. The memorial products may also include casket bier designs, floral display designs, memorial tables for displaying personal items of the deceased and memorial boards for displaying photos of the deceased.

The menu of memorial products may include personal effects of the deceased, such as for example keepsakes of the deceased or other personal items of the deceased.

The invention also resides in a vignette adapted to be included in a funeral or other memorial service which memorializes the deceased. The vignette comprises a vignette theme which represents at least one aspect of the deceased's life, and memorial items, consistent with the vignette theme, positioned in the vignette and portraying the at least one aspect of the deceased's life.

These and other features and advantages of the present invention will become more readily apparent during the following detailed description taken in conjunction with the drawings herein, in which:

BRIEF DESCRIPTION OF THE DRAWINGS OF A PREFERRED EMBODIMENTS OF THE INVENTION

DETAILED DESCRIPTION OF THE PREFERRED EMBODIMENT OF THE INVENTION

Figure 1:
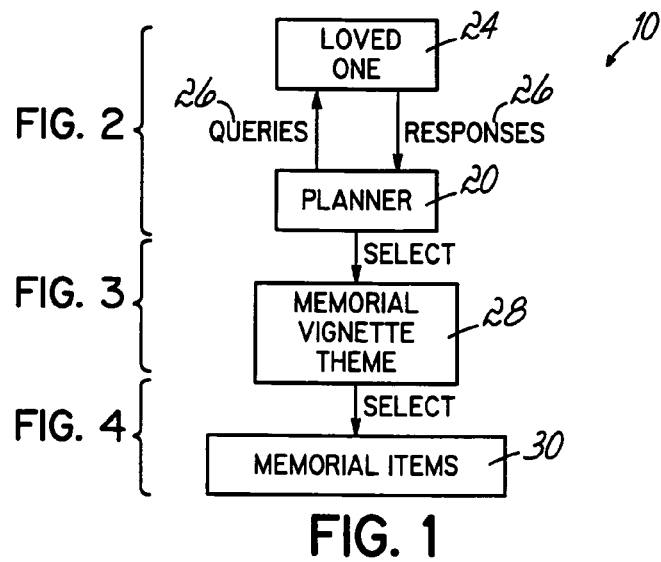
FIG. 1 is a block diagram of a preferred embodiment of a method of planning a funeral or other memorial service according to the principles of the present invention.

Referring first to FIG. 1. there is illustrated a block diagram 10 illustrating a preferred embodiment of the method of planning a funeral or other memorial service according to the principles of the present invention. As shown in the Figure, a planner 20 poses queries 22 to a surviving loved one 24 of a deceased. The loved one 24 provides responses 26 to the planner 20. Based on the responses 26, the planner 20 is able to select a memorial vignette theme 28. Within the memorial vignette theme 28, the planner can then select memorial items 30 to be incorporated into the chosen memorial vignette theme 28. Planner 20 could be either a live funeral director, or alternatively, a computer programmed with appropriate interactive software which queries the loved one 24 and, via a keyboard for example, allows the loved one to input responses 26 in response to the queries 22. In the latter case the computer and software could be located in the funeral home or alternatively a customer could access the interactive software from a home computer over the Internet.

As used herein the term "vignette" is used to describe a "memorial scene" or "stage set" complete with "memorial items" not unlike "stage props," for use in a funeral or other memorial service. Such a vignette is especially suitable for the traditional "visitation" wherein the deceased is presented in a casket for "viewing" by surviving loved ones such as family, friends, co-workers, etc., the object of the vignette being to present the deceased in an environment which is customized and/or personalized to the deceased. Various memorial items may be selected for display and use in a particular vignette, such as products offered for sale by the funeral home or keepsakes or personal items of the deceased, as will be described below in more detail.

Figure 2:
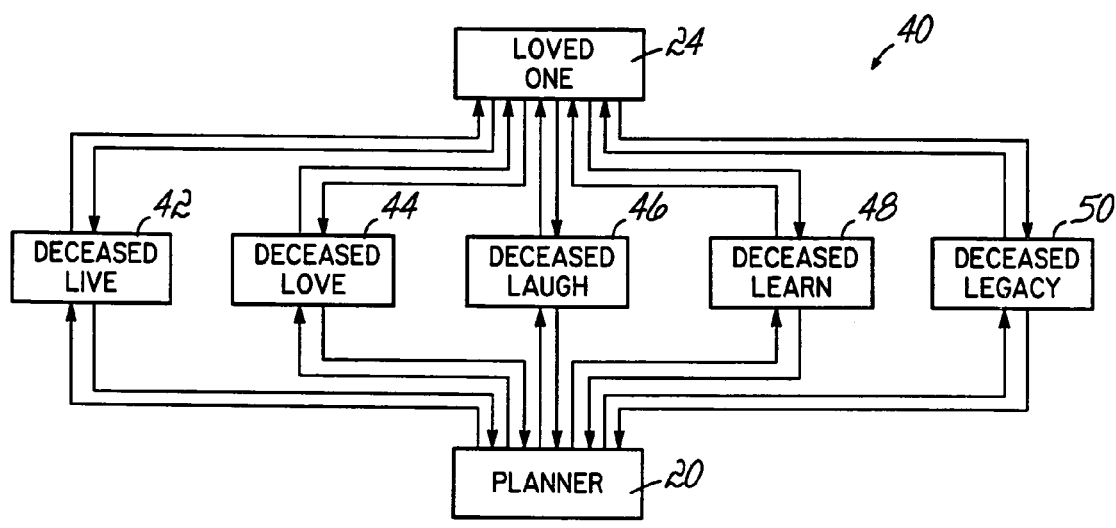
FIG. 2 is a detailed block diagram of the first stage of the method of FIG. 1.

Referring now to FIG. 2, there is shown in additional detail a block diagram 40 corresponding to the initial stage of the method illustrated by block diagram 10 in FIG. 1. More specifically, queries 42, 44, 46. 48 and 50 are made by planner 20 of loved one 24. Query 42 is "How did the deceased LIVE?" Follow up questions corresponding to Query 42 could be the following: "Think of five words that describe him." "What traits did you admire most?" "Did he ever give you any words of wisdom?"

Query 44 is "Whom did she LOVE?" Follow up questions corresponding to Query 44 could be: "What relationships were important to her?" "Other than family, who will be affected by her death?" "Who had the most influence on her life?"

Query 46 is "What made him LAUGH?" Follow up questions corresponding to Query 46 could be: "What did he do for fun when he was younger?" "In later years, how did he enjoy spending his free time?" "What type of things gave him pleasure?"

Query 48 is "What things did she LEARN?" Follow up questions corresponding to Query 48 could be: "What things interested her?" "What accomplishments made her proudest?" "Was she a member of any clubs or organizations?"

Lastly, Query 50 is "What kind of LEGACY did he leave?" Follow up questions corresponding to Query 50 could be: "How would he want to be remembered?" "What stories would he want passed on to future generations?" "What five objects could you collect that capture what he was about?" The queries 42, 44, 46, 48 and 50 (known as the "five L's"), as well as the follow up queries, are designed to elicit responses 26 from the loved one 24 which enable the planner 20 to select a memorial vignette theme from a menu of memorial vignette themes as will be described in more detail below with reference to FIG. 3.

Figure 3:
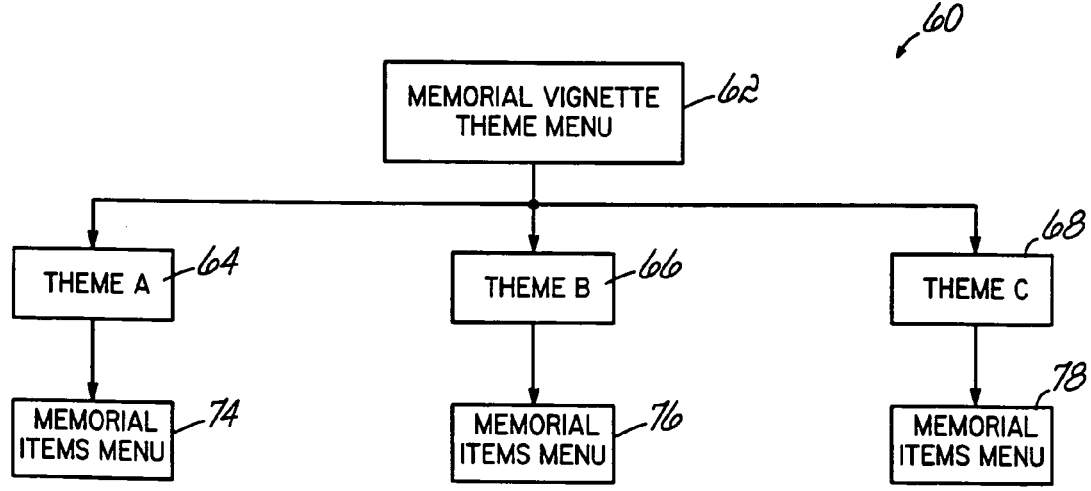
FIG. 3 is a detailed block diagram of the second stage of the method of FIG. 1.

Alternatively, the initial queries/responses stage illustrated in FIG. 2 could be dispensed with, in which case the first step in the method of planning a funeral or other memorial service would be the block diagram 60 illustrated in FIG. 3. Thus, the planner 20 would present to the loved one 24 a menu of various memorial vignette themes, for example theme A 64, theme B 66 and theme C 68. The loved one 24 would select amongst the themes 64, 66, 68 based on some aspect of the deceased's life, for example the lifestyle of the deceased, the vocation of the deceased, the avocation of the deceased, personal or religious beliefs of the deceased, etc. to be showcased during the funeral or other memorial service. Once the loved one 24 made a selection of a vignette theme, the planner 20 would present a menu of memorial items for that specific theme. For example, memorial items menu 74 would be presented if theme A 64 is selected, memorial items menu 76 would be presented if theme B 66 is selected, memorial items menu 78 would be presented if theme 68 is selected, etc.

Figure 4:
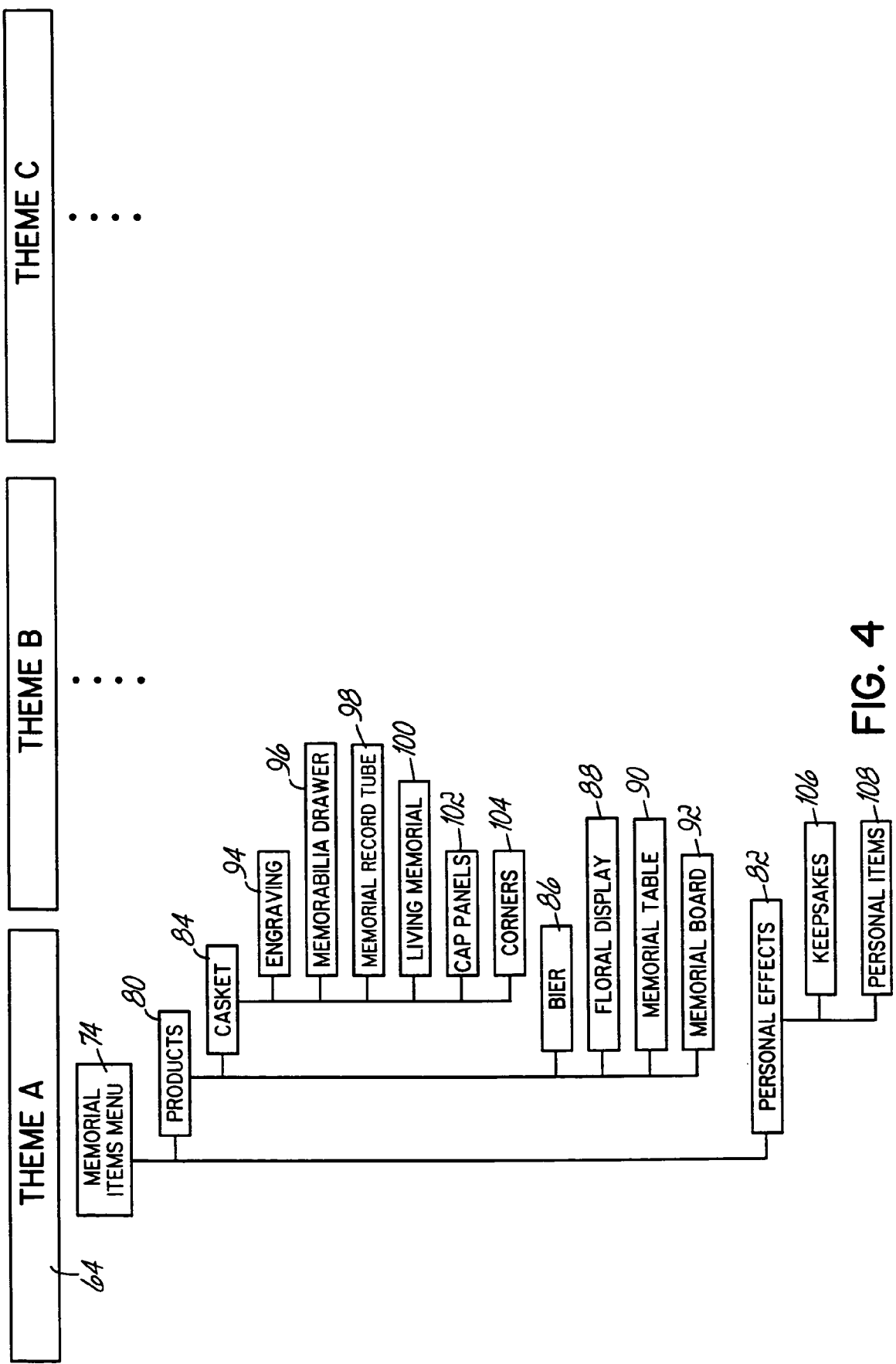
FIG. 4 is a detailed block diagram of the third stage of the method of FIG. 1.

Referring now to FIG. 4, an example of a menu 74 of memorial items for particular theme A 64 is illustrated. As illustrated, the two main memorial items listed in the memorial items menu 74 for theme A 64 are products 80 and personal effects of the deceased 82. Amongst the products 80 offered there are caskets 84, casket biers 86, floral displays 88, memorial tables 90 and memorial boards 92.

Offered amongst the caskets 84 there may be custom engraved caskets 94, the Batesville® MemorySafe® line of caskets with memorial drawers 96, the Batesville® Memorial Record Tube® line of caskets with memorial record tubes 98, the Batesville® Living Memorial® line of caskets 100 (wherein a tree is planted in a national forest to commemorate the life of the deceased and to renew the natural resource), various casket cap panel designs 102 including the Batesville® MemoryFrame® line of cap panels and various casket corner designs 104 including the Batesville® LifeSymbols® line of corner adornments.

The other item under the memorial items menu 74, personal effects 82 of the deceased, could include keepsakes 106 of the deceased and/or any other personal items 108 of the deceased which are desired to be included in the memorial vignette theme selected. The personal items could be either those items owned by the deceased or items available from the funeral home or other source and which exhibit some aspect of the deceased's life. The designs of the products and the types of personal effects listed in the memorial items menu will differ from vignette theme to vignette theme, and will be consistent with or otherwise tied to their respective theme.

Figure 5:
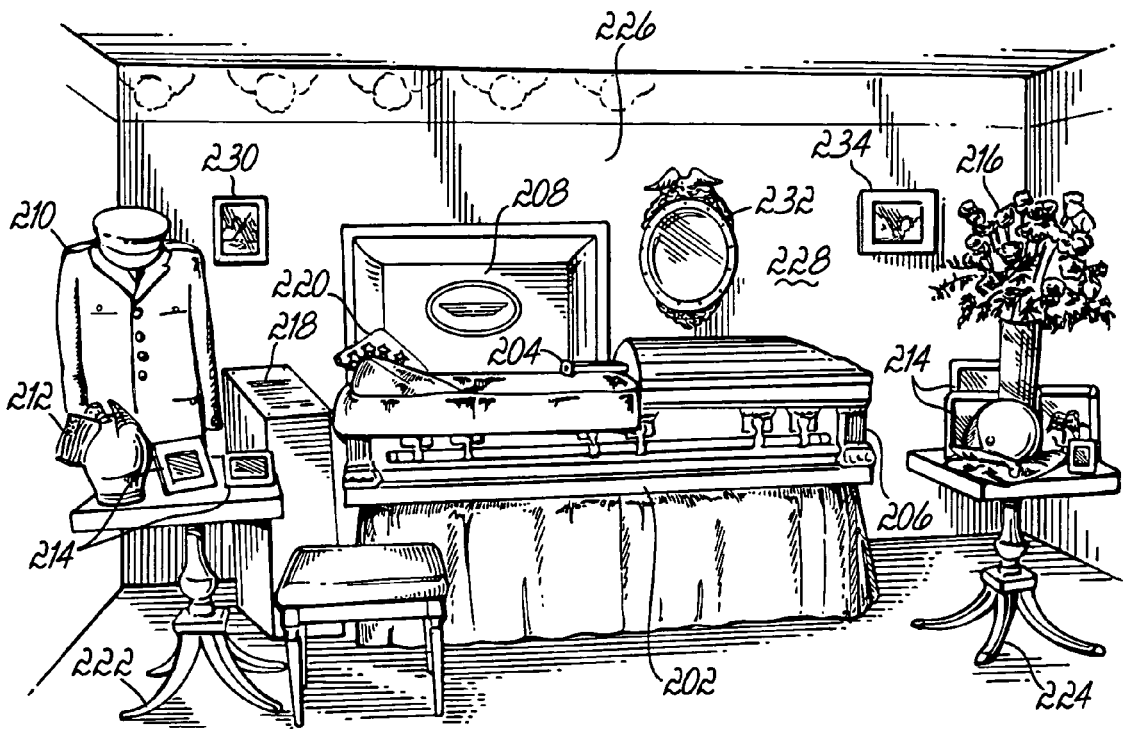
FIG. 5 is a perspective view of a military service themed vignette for a funeral or other memorial service.

Referring now to FIGS. 5-8, there are illustrated examples of vignettes created utilizing the principles of the present invention. Referring first to FIG. 5, this vignette 200 has an Armed Services theme, and includes memorial items consistent with this theme. For example the vignette 200 includes a casket 202 the design of which has been selected to emphasize the military service theme. Casket 202 may preferably include a memorabilia drawer 204 for displaying and storing memorial items of the deceased such as military medals, etc. The casket 202 has had its corner adornments 206 likewise selected to be consistent with the military theme. The head end cap includes a cap panel 208 which may be decorated to further complement the military theme. In addition, personal items of the deceased may be included in the vignette 200, such as, for example, the deceased's military uniform 210, military service awards or photos 212 and 214. floral display 216, monument 218, folded American flag 220, etc. Memory tables 222, 224 can be utilized to display the memorial items. The back drop 226 may also be designed with the military theme in mind including patriotic wall covering 228 and wall hangings 230, 232, 234. The traditional bier (not shown) supporting the casket 202 may be draped with formal military fabric 236.

Figure 6:
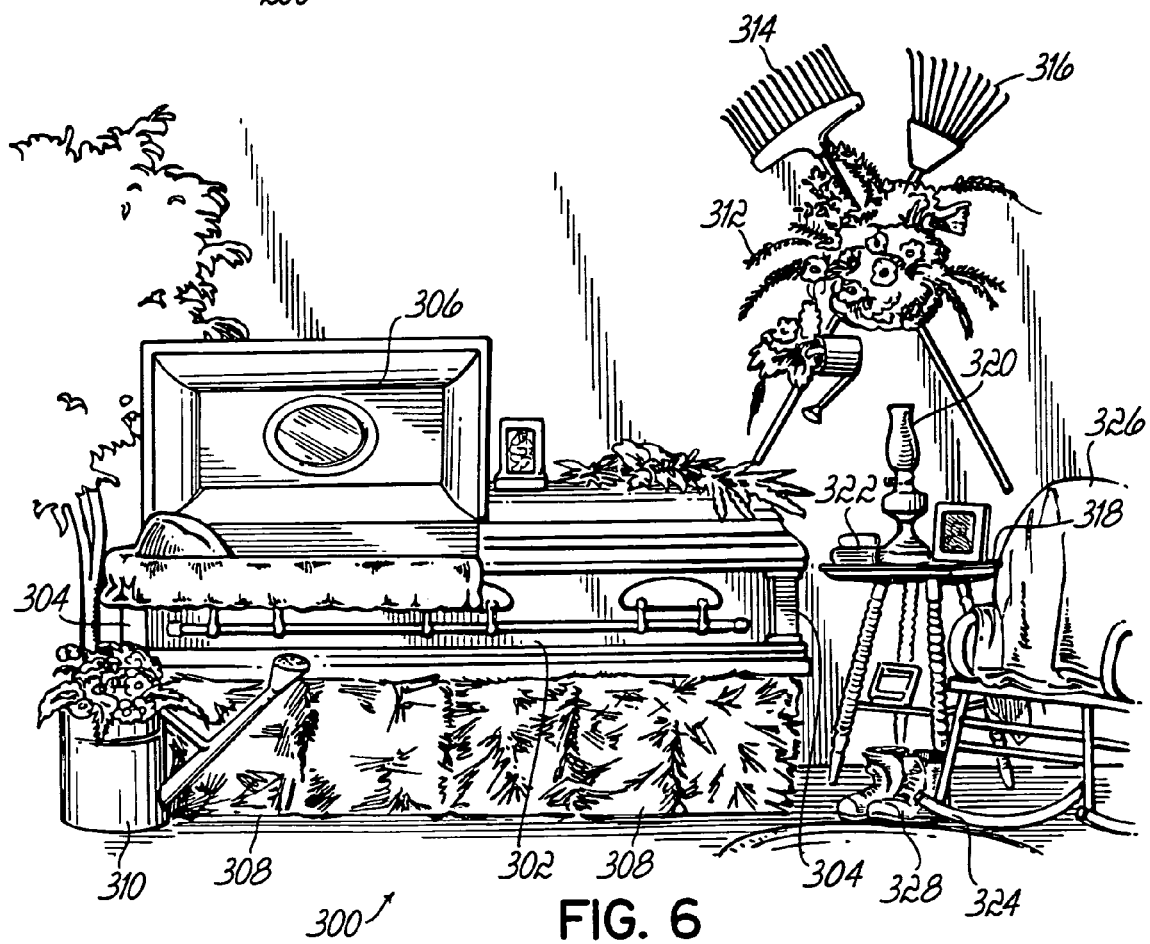
FIG. 6 is a perspective view of a gardening themed vignette for a funeral or other memorial service.

Referring now to FIG. 6, a farming vignette 300 is illustrated. In this vignette, the casket 302 includes a design which has been selected to be consistent with the vignette 300, including its corner adornments 304 and cap panel 306. Bales of hay 308 are utilized to support the casket 302 rather than traditional casket biers. A number of additional memorial items are included in the vignette 300, for example watering container 310, floral arrangement 312 including farming rakes 314 and 316, memorial table 318 including a favorite lamp 320 and Bible 322 thereon, favorite rocking chair 324, favorite blanket 326 and well worn farm boots 328.

Figure 7:
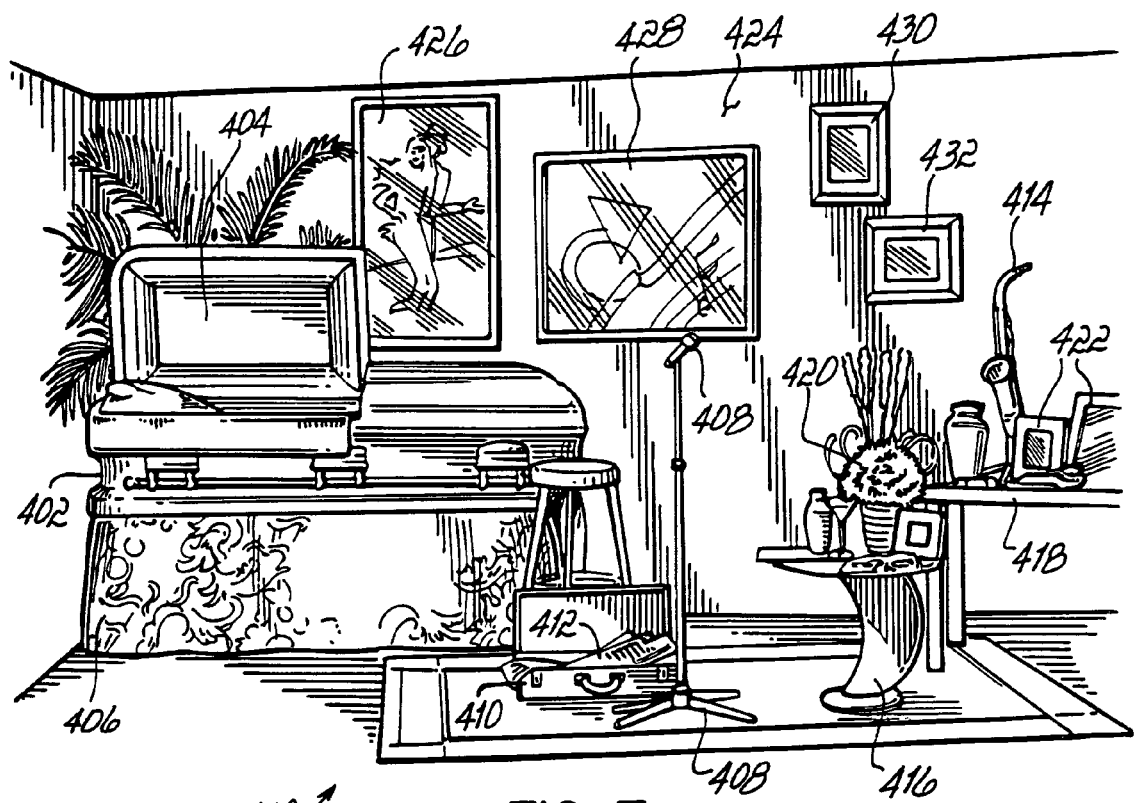
FIG. 7 is a perspective view of a music themed vignette for a funeral or other memorial service.

Referring now to FIG. 7, there is illustrated another vignette 400 which might be appropriate for a deceased whose hobby was music. As in the other prior vignettes, the casket 402 including head end cap 404 are selected so as to be consistent with the vignette. The traditional bier (not shown) supporting the casket 402 can be decorated or dressed with appropriate fabric 406 consistent with the theme. Personal items relating to the music theme such as microphone 408, instrument case 410, sheet music 412 and musical instrument 414 can be positioned within the vignette 400 on the floor or on memory tables 416 and 418. Additional items such as floral displays 420, photos 422, etc. can also be displayed on the memory tables 416 and 418. The back drop 424 can likewise emphasize the music theme by conjuring up images of a dance club complete with festive wall hangings 426, 428, 430 and 432.

Figure 8:
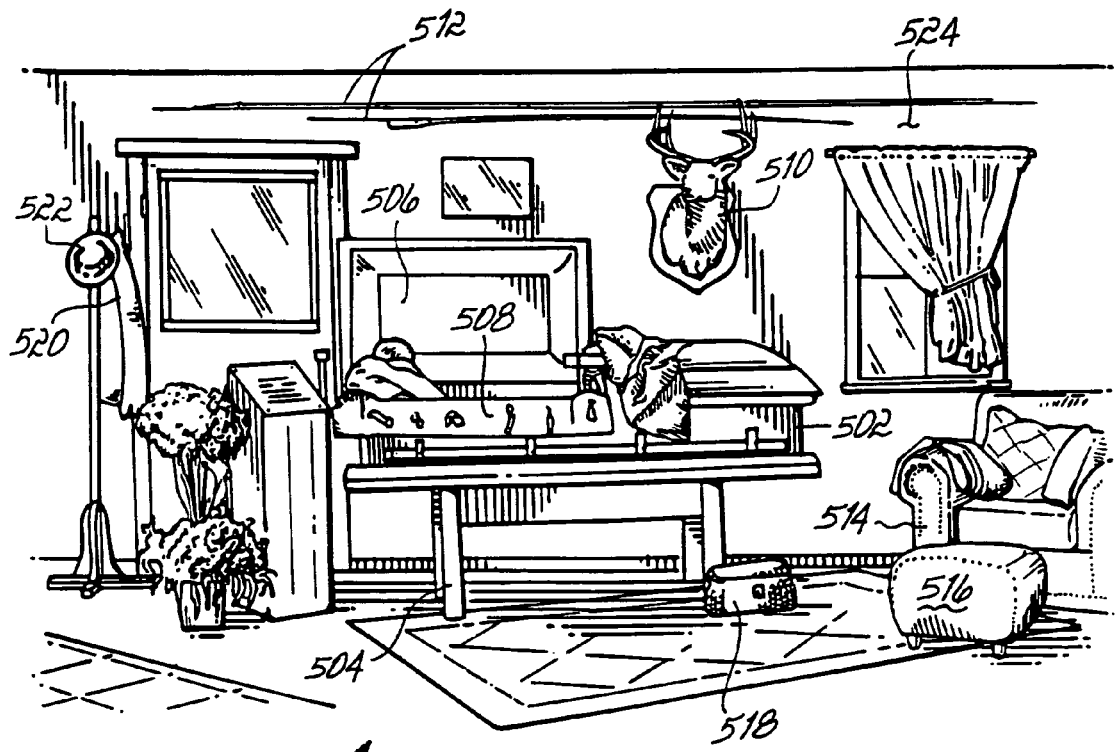
FIG. 8 is a perspective view of an outdoor sportsman, i.e. hunting and fishing, vignette for a funeral or other memorial service.

Referring now to FIG. 8, there is illustrated yet another vignette 500 which would be suitable for a deceased who is an avid outdoorsman, i.e. hunter and/or fisherman. In this vignette 500 an appropriate casket design 502, for example hardwood is supported atop a rustic table 504 and may include a head end cap 506 with appropriate outdoor scene embroidered thereon and, for example flannel material 508 lining the casket 502. A number of personal items may be included in the vignette, such as for example a trophy deer mount 510, fly rods 512, favorite easy chair 514 with ottoman 516, fish basket 518, favorite jacket 520 and hat 522, etc. The back drop 524 for the vignette 500 could take the appearance of the interior of a rustic log cabin for example.

Those skilled in the art will readily recognize numerous adaptations and modifications which can be made to the present invention which will result in an improved method of planning funerals and other memorial services, yet all of which will fall within the spirit and scope of the present invention as defined in the following claims. Accordingly, the invention is to be limited only by the scope of the following claims and their equivalents.

What is claimed is:

1. A method of assisting a loved one of a deceased in planning a funeral or other service which memorializes the deceased, the method comprising:
    querying the loved one with a query selected from a predetermined plurality of queries as to various aspects of the life of the deceased,
    based on the loved one's responses to the query, asking a plurality of questions related to the query to elicit responses from the loved one; and
    using a computer to execute a computer program configured to process the responses from the loved one to enable the selection of a theme, from a menu of themes stored in a computer, for a vignette to be incorporated into the funeral or other service, wherein the vignette comprises a selection of one or more memorial items associated with the theme.

2. The method of claim 1 wherein the vignette theme is designed around the lifestyle of the deceased.

3. The method of claim 1 wherein the vignette theme is designed around the vocation of the deceased.

4. The method of claim 1 wherein the vignette theme is designed around the avocation of the deceased.

5. The method of claim 1 wherein the vignette theme is one selected from a group consisting of:
    military service;
    gardening;
    farming;
    hunting;
    fishing;
    sports; and
    music.

6. The method of claim 1 wherein the menu of memorial items includes memorial products.

7. The method of claim 1 wherein the memorial products include a plurality of casket designs.

8. The method of claim 7 wherein the plurality of casket designs includes custom engraved caskets.

9. The method of claim 7 wherein the plurality of casket designs includes casket having a memorabilia drawer built therein.

10. The method of claim 7 wherein the plurality of casket designs includes caskets having a memorial record tube built therein.

11. The method of claim 7 wherein the plurality of casket designs includes a plurality of casket cap panel designs.

12. The method of claim 11 wherein the plurality of casket cap panel designs includes cap panels adapted to be removed from the casket and presented to the loved one as a keepsake.

13. The method of claim 7 wherein the plurality of casket designs includes a plurality of casket corner adornment designs.

14. The method of claim 1 wherein the memorial products include a plurality of casket bier designs.

15. The method of claim 1 wherein the memorial products include a plurality of floral display designs.

16. The method of claim 1 wherein the memorial products include a memorial table for displaying personal items of the deceased.

17. The method of claim 1 wherein the memorial products include a memorial board for displaying photos of the deceased.

18. The method of claim 1 wherein the menu of memorial items includes personal effects of the deceased.

19. The method of claim 18 wherein the personal effects include keepsakes of the deceased.

20. The method of claim 18 wherein the personal effects include personal items of the deceased.

21. A method of assisting a loved one of a deceased in planning a funeral or other service which memorializes the deceased, the method comprising:
   querying the loved one with a query selected from a predetermined plurality of queries as to various aspects of the life of the deceased;
   based on the loved one's responses to the query, asking a plurality of questions related to the query to elicit responses from the loved one;
   using a computer to execute a computer program configured to process the responses from the loved one to enable the selection of a theme, from a menu of themes stored in a computer, for a vignette to be incorporated into the funeral or other service, wherein the vignette comprises a selection of one or more memorial items associated with the theme; and
   within the selected theme, selecting the one or more memorial items from a menu of memorial items to be utilized in the vignette.

22. The method of claim 21 wherein the queries posed to the loved one include at least one of the queries from the group consisting of:
   how did the deceased live;
   whom did the deceased love;
   what made the deceased laugh;
   what did the deceased learn; and
   what legacy did the deceased leave.

23. The method of claim 21 wherein the queries posed to the loved one comprise:
   how did the deceased live;
   whom did the deceased love;
   what made the deceased laugh;
   what did the deceased learn; and
   what legacy did the deceased leave.

24. The method of claim 21 wherein the vignette theme is designed around the lifestyle of the deceased.

25. The method of claim 21 wherein the vignette theme is designed around the vocation of the deceased.

26. The method of claim 21 wherein the vignette theme is designed around the avocation of the deceased.

27. The method of claim 21 wherein the vignette theme is one selected from a group consisting of:
   military service;
   gardening;
   farming;
   hunting;
   fishing;
   sports; and
   music.

28. The method of claim 21 wherein the menu of memorial items includes memorial products.

29. The method of claim 28 wherein the memorial products include a plurality of casket designs.

30. The method of claim 29 wherein the plurality of casket designs includes custom engraved caskets.

31. The method of claim 29 wherein the plurality of casket designs includes caskets having a memorabilia drawer built therein.

32. The method of claim 29 wherein the plurality of casket designs includes caskets having a memorial record tube built therein.

33. The method of claim 29 wherein the plurality of casket designs includes a plurality of casket cap panel designs.

34. The method of claim 33 wherein the plurality of casket cap panel designs includes cap panels adapted to be removed from the casket and presented to the loved one as a keepsake.

35. The method of claim 29 wherein the plurality of casket designs includes a plurality of casket corner adornment designs.

36. The method of claim 28 wherein the memorial products include a plurality of casket bier designs.

37. The method of claim 28 wherein the memorial products include a plurality of floral display designs.

38. The method of claim 28 wherein the memorial products include a memorial table for displaying personal items of the deceased.

39. The method of claim 28 wherein the memorial products include a memorial board for displaying photos of the deceased.

40. The method of claim 21 wherein the menu of memorial items includes personal effects of the deceased.

41. The method of claim 40 wherein the personal effects include keepsakes of the deceased.

42. The method of claim 40 wherein the personal effects include personal items of the deceased.

43. A method of assisting a loved one of a deceased in planning a funeral or other service which memorializes the deceased, the method comprising:
   querying the loved one with a query selected from a predetermined plurality of queries as to various aspects of the life of the deceased;
   based on the loved one's responses to the query, asking a plurality of questions related to the query to elicit responses from the loved one;
   querying the loved one with each of the remaining queries from a predetermined plurality of queries as to various aspects of the life of the deceased;
   based on the loved one's responses to each of the remaining queries, asking a plurality of questions related to each query to elicit responses from the loved one;

using a computer to execute a computer program configured to process the responses from the loved one to enable the selection of a theme, from a menu of themes stored in a computer, for a vignette to be incorporated into the funeral or other service, wherein the vignette comprises a selection of one or more memorial items associated with the theme.

44. A method of assisting a loved one of a deceased in planning a funeral or other service which memorializes the deceased, the method comprising:

determining a plurality of queries to understand various aspects of the life of a deceased;

determining a plurality of questions for each of the plurality of queries;

asking the plurality of questions related to one of the plurality of queries to elicit responses from the loved one; and using a computer to execute a computer program configured to process the responses from the loved one to enable the selection of a theme, from a menu of themes stored in a computer, for a vignette to be incorporated into the funeral or other service, wherein the vignette comprises a selection of one or more memorial items associated with the theme.

45. A method of assisting a loved one of a deceased in planning a funeral or other service which memorializes the deceased, the method comprising:

providing a plurality of queries to understand various aspects of the life of a deceased, providing a plurality of questions for each of the plurality of queries;

asking the plurality of questions related to one of the plurality of queries to elicit responses from the loved one; and using a computer to execute a computer program configured to process the responses from the loved one to enable the selection of a theme, from a menu of themes stored in a computer, for a vignette to be incorporated into the funeral or other service, wherein the vignette comprises a selection of one or more memorial items associated with the theme.

* * * * *